United States Patent [19]

Schaffer

[11] Patent Number: 4,994,786
[45] Date of Patent: Feb. 19, 1991

[54] U-TURN SIGNAL

[76] Inventor: Michael Schaffer, 411 W. Lake Dasha Dr., Plantation, Fla. 33324

[21] Appl. No.: 444,841

[22] Filed: Dec. 4, 1989

[51] Int. Cl.⁵ .............................................. B60Q 1/34
[52] U.S. Cl. .................................... 340/478; 340/463; 340/465; 340/468; 340/472
[58] Field of Search ............... 340/478, 473, 475, 472, 340/463, 464, 465, 470, 471, 485, 488, 468, 461; 362/80.1, 83.3

[56] References Cited

U.S. PATENT DOCUMENTS

| | | |
|---|---|---|
| 2,453,421 | 11/1948 | Dyer . |
| 2,751,522 | 6/1956 | Spangenberg . |
| 2,843,952 | 7/1958 | Zgraggen . |
| 3,019,415 | 1/1962 | Manon, Sr. ........................ 340/478 |
| 3,128,448 | 4/1964 | Shumer et al. . |
| 3,492,638 | 1/1970 | Lane . |
| 3,747,063 | 7/1973 | Hudson, Jr. ........................ 340/908 |
| 4,387,361 | 6/1983 | Reed . |
| 4,631,516 | 12/1986 | Clinker . |
| 4,860,177 | 8/1989 | Simms ................................. 340/472 |

Primary Examiner—Donnie L. Crosland
Attorney, Agent, or Firm—Oltman and Flynn

[57] ABSTRACT

A U-turn signal for vehicles, which includes a plurality of lights forming an inverted "U", a flashing arrangement for sequentially flashing the lights to indicate the intended direction of the U-turn, and an actuating arrangement for actuating the flashing arrangement, and wherein the U-turn signal is positioned rearwardly facing from the vehicle.

12 Claims, 2 Drawing Sheets

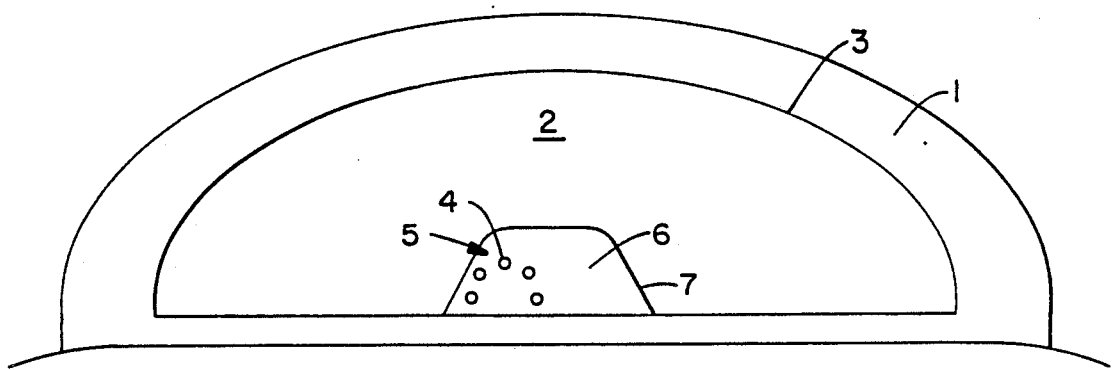
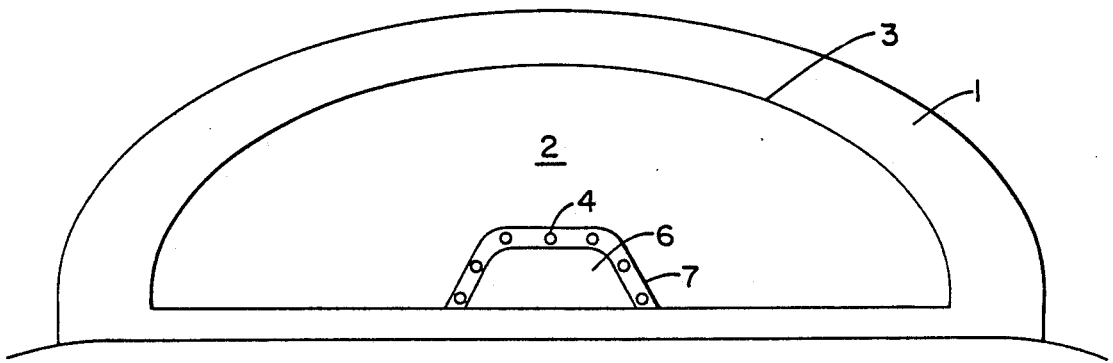
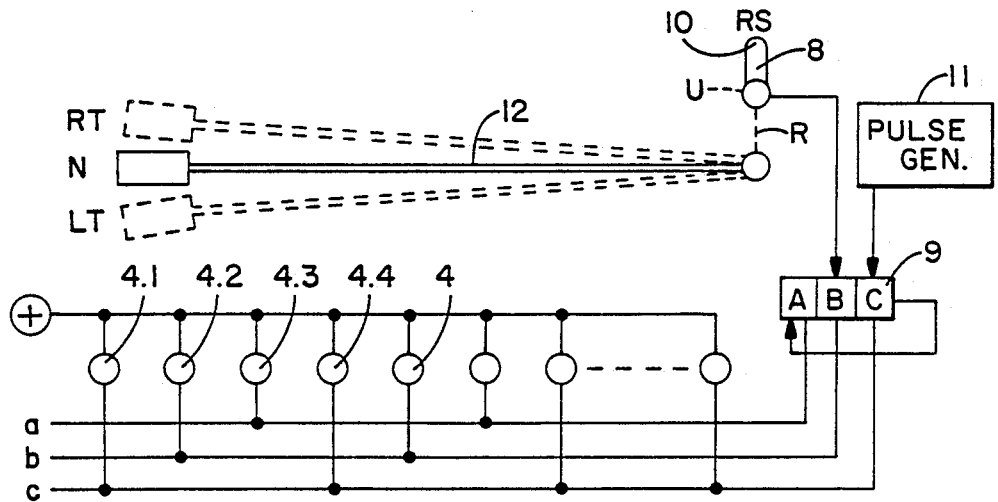

U-TURN SIGNAL

The invention relates to directional signals for vehicles and more particularly to a directional signal by means of which a driver can signal to traffic behind him of his intention to make a U-turn.

GENERAL BACKGROUND & PRIOR ART

It is well known to drivers of motor vehicles that making a U-turn in heavy traffic often poses risks for accidents, because drivers of other vehicles other than that of the driver making a U-turn, do not know in advance if the person making the turn intends to make just a left hand turn or intends to make a complete U-turn.

Various inventors have proposed solutions to this problem U.S. Pat. No. 4,387,361 shows a U-turn vehicle light which mounts on a vehicle hood and can be raised to a visible position above the hood in response to a switch operated by the driver, to indicate his intention to make a complete U-turn.

U.S. Pat. No. 2,751,522 shows a signal light system for motor vehicles that enables a driver of the vehicle of his intended moves.

None of the known signaling systems however, have provided a simple, inexpensive and easy to use signaling system for clearly signaling to vehicles coming from behind, of a driver's intention to make a U-turn.

It is accordingly the main object of the instant invention to provide a signaling system that is very simple in construction and easy to use and which provides for drivers of other vehicles coming from behind a clear signal indicating an intended U-turn.

SUMMARY OF THE INVENTION

There is accordingly provided a U-turn signal for vehicles which includes a plurality of lights forming an inverted "U", a flashing arrangement for sequentially flashing the lights to indicate an intended U-turn from right to left and an actuating arrangement for actuating the flashing arrangement, and wherein the U-turn signal is positioned rearwardly facing from the vehicle.

In accordance with another feature there is provided a U-turn signal for vehicles having a rearward facing brake light, wherein the U-turn lights are arranged along the rim of the brake light.

In accordance with still another feature, there is provided a U-turn signal for vehicles wherein the flashing arrangement includes an electronic counter coupled to said lights for generating an appearance of the direction from right to left of the turn.

According to still another feature there is provided a U-turn signal for vehicles wherein the counter includes three counting stages coupled as a ring counter, and a pulse generator for driving the ring counter. There may further be provided a U-turn signal for vehicles with a driver's location, wherein the actuating arrangement includes a u-turn switch located at the driver's location.

Optionally, there may also be provided a U-turn signal for vehicles having a conventional turn signal lever which includes automatic reset for the turn signal, wherein the automatic reset is coupled to the turn signal lever for automatically resetting the U-turn switch when the turn signal lever returns to its neutral position. In accordance with still a further feature the u-turn switch includes a single locking switch button for locking the u-turn in its flashing condition until it is reset.

Further objects and advantages of this invention will be apparent from the following detailed description of a presently preferred embodiment which is illustrated schematically in the accompanying drawings.

BRIEF DESCRIPTION OF THE DRAWING

FIG. 1 is an elevational fragmentary view of the invention showing a rear vehicle window, and a U-turn signal positioned within a brake light within the window;

FIG. 2 is an elevational fragmentary view of the invention showing a rear vehicle window with a brake light, and U-turn lights arranged along the rim of the brake-light;

FIG. 3 is a block diagram of the invention showing its major elements; and

DESCRIPTION OF THE PREFERRED EMBODIMENTS

Figure 4:
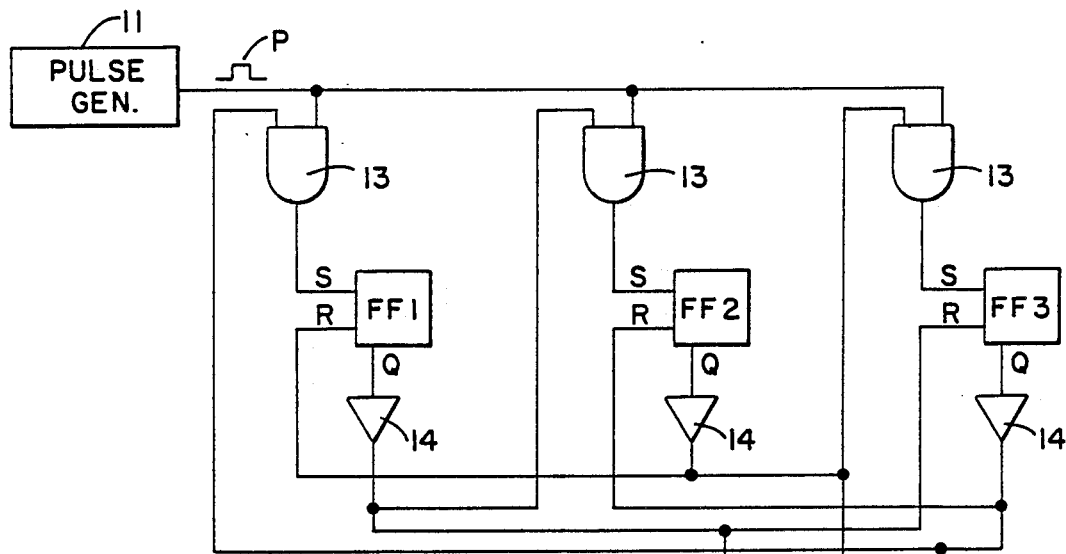
FIG. 4 is a more detailed circuit diagram of the invention showing the electrical circuit components.

Before explaining the disclosed embodiment of the present invention in detail it is to be understood that the invention is not limited to its application to the details of the particular arrangement shown since the invention is capable of other embodiments. Also, the terminology used herein is for the purpose of description and not of limitation.

FIG. 1 is a fragmentary rear view of a vehicle 1 having a rearward facing window 2 having a window rim 3 along the perimeter of the window. A brake light 6 is arranged in conventional manner within the rim of the window 2. A plurality of small signal lights 4 are arranged within the perimeter 7 of the brake light forming an inverted "U" 5. The lights may typically be small incandescent lights, or light-emitting diodes of any suitable color, for example, white, yellow or amber, which are clearly visible even in clear daylight, from behind the vehicle.

FIG. 2 is also a fragmentary rear view of a vehicle having a rearward facing window 3, and again a conventional brake light 6 mounted in or near the rear window in conventional manner. The stop light 6 has a rim 7, in which small signal lights 4 are mounted along a rim of the brake light forming an inverted "U". It follows that other arrangements of mounting the brake light could be devised, such as for example a separate brake light fixture with the signal lights 4 forming an inverted "U", mounted in a highly visible location on the vehicle, other than those described above, for example on the trunk lid or the like.

FIG. 3 shows in block diagram form a flashing arrangement for the lights 4 that operates to flash the lights 4 sequentially so that they appear as a moving stream of lights, moving from right to left driven by a light actuating arrangement controlled by the driver of the vehicle, by means of a two-position switch arrangement 8, having a left position "U" for indicating a U-turn, and a center position RS. The switch arrangement 8 controls a flashing circuit 9 constructed as an electronic ring counter 9 driven by a pulse generator 11. The ring counter 9, which may have any number of counting stages, advantageously has three counting stages A, B, and C, which are actuated sequentially one at the time, e.g. in direction from left to right in step with the pulse rate from the pulse generator 11. The ring counter 9 may be constructed as a relay counting chain or as an electronic counter, and will be described in more detail hereinbelow. The outputs from the ring counter stages A, B & C are arranged as a three-phase bus with conductors a, b & c. The lights 4 are connected in rotation to the conductors a, b, c, such that the first light 4.1 is connected to connector c, light 4.2 to conductor b, light 4.3 to conductor a, light 4.4 again to conductor c and so forth. As the ring counter is running, all lights will be flashing sequentially on and off, giving the appearance of a moving stream of lights.

The two-position switch 8 may advantageously be coupled to the vehicle's turn signal lever 12 such that when the lever returns to neutral position N, a mechanical linkage, shown as a dotted line R, operates to automatically return the two-position switch 8 to the reset position RS, when the u-turn is completed and the turn signal lever 12 springs back to neutral position N, as provided in most vehicles. It follows that the linkage R can be realized in many ways, for example by means of cam on lever 12 that lifts a lever 10 of switch 8 out of a spring-biased detent or the like.

In accordance with the invention, another mode of operation may be attained if the two-position switch arrangement 8 is a single button locking switch which, when depressed, stays in the locked position to which the turn signal remains activated. The single button switch is coupled to the turn signal lever 12 such that resetting of the turn signal lever 12 automatically unlocks the signle button switch.

Figure 4A:
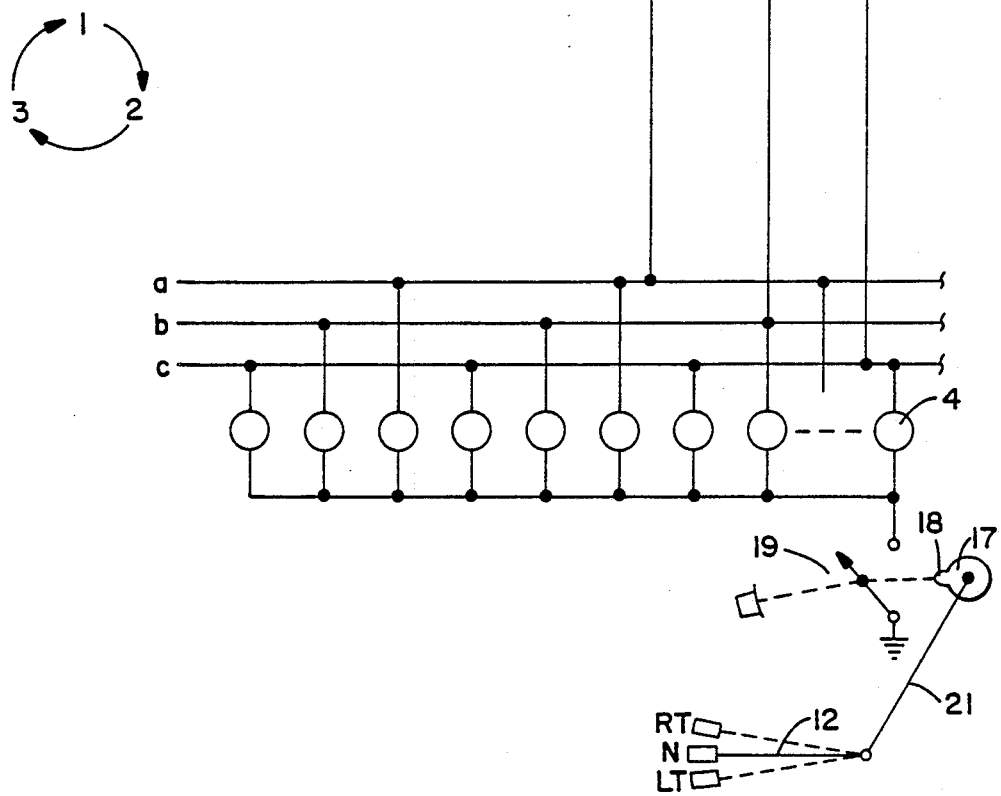
FIG. 4a shows the direction of flashing of the circuit according to FIG. 4.

In FIG. 4 a three stage ring counter consisting of three J-K Flip-Flops FF1, FF2 and FF3 is driven by the pulse generator 11, which drives the ring counter through AND-gates 13, each AND-gate having an output connected to a set pin S of each respective flip-flop FF1, FF2, FF3. Each time the counter advances one step, the flip-flop following the one that is "on" at the time of the trailing edge of the clock pulse P, is set, and the flip-flop being turned on automatically resets the "on" flip-flop by means of a connection from the output Q of each flip-flop via an amplifier 14 to the reset R of the preceeding flip-flop. FIG. 4a shows the direction of counting of the ring counter.

The amplifiers 14 also serve to drive the signal lights 4 via conductors a, b, and c. A single U-turn button switch 19 of locking construction or having locking means, is operated manually by the driver after he has indicated a left hand turn with his turn signal lever 12. The single U-turn button switch 19 activates the lights 4 by connecting ground potential to one side of the lights 4. When the turn lever 12 automatically goes back to neutral N after completion of a u-turn a cam 18 on a cam disc 17 coupled by means of linkage 21 to the turn signal lever 12, unlocks or opens the single button switch 19, and stops the U-turn signal from indicating.

I claim:

1. A U-turn signal for a vehicle, comprising an inverted "U", flashing means including a plurality of sequentially flashing lights in said "U", to indicate intended direction of said U-turn, actuating means for selectively activating said flashing lights in the intended direction of said U-turn, and wherein the U-turn signal is disposed rearwardly facing from said vehicle.

2. U-turn signal for a vehicle, according to claim 1, wherein said vehicle has a rear window, a brake light disposed within said rear window, and said flashing lights are disposed along a rim of said brake light.

3. U-turn signal for a vehicle, according to claim 1 having a rearward facing brake light, wherein said flashing lights are disposed within a rim of said brake light.

4. U-turn signal for a vehicle according to claim 1, wherein said flashing means include a ring counter coupled to said flashing lights.

5. U-turn signal for a vehicle according to claim 4, wherein said ring counter includes three counting stages coupled as a ring counter, and a pulse generator for driving said ring counter.

6. U-turn signal for a vehicle according to claim 1 having a driver's location, wherein said actuating means include two-position switch means disposed at said driver's location, said two-position switch means having an active and a reset position for respectively activating and deactivating said u-turn signal.

7. U-turn signal according to claim 6, for a vehicle having a turn signal lever, including automatic reset means for said two-position switch means, said automatic reset means coupled to said turn signal lever for automatically resetting said two-position switch means when said turn signal lever returns to its neutral position.

8. U-turn signal according to claim 6, wherein said two-position switch means include locking means for locking said two-position switch means in said active position.

9. U-turn signal according to claim 7, wherein said two-position switch means include a single switch button for indicating the driver's intention to make a u-turn in response to a depression of said single switch button.

10. U-turn signal according to claim 9, wherein said automatic reset means include linkage coupling said single switch button with said turn signal lever, said linkage including a cam disc having a cam deactivating said single switch button in the neutral position of said turn signal lever.

11. A u-turn signal according to claim 1, wherein said flashing means include a ring counter having a plurality of counting stages coupled to said plurality of lights.

12. A u-turn signal according to claim 11, including at least three flip-flop's forming said ring counter and a pulse generator driving said flip-flop's.

* * * * *